UNITED STATES PATENT OFFICE.

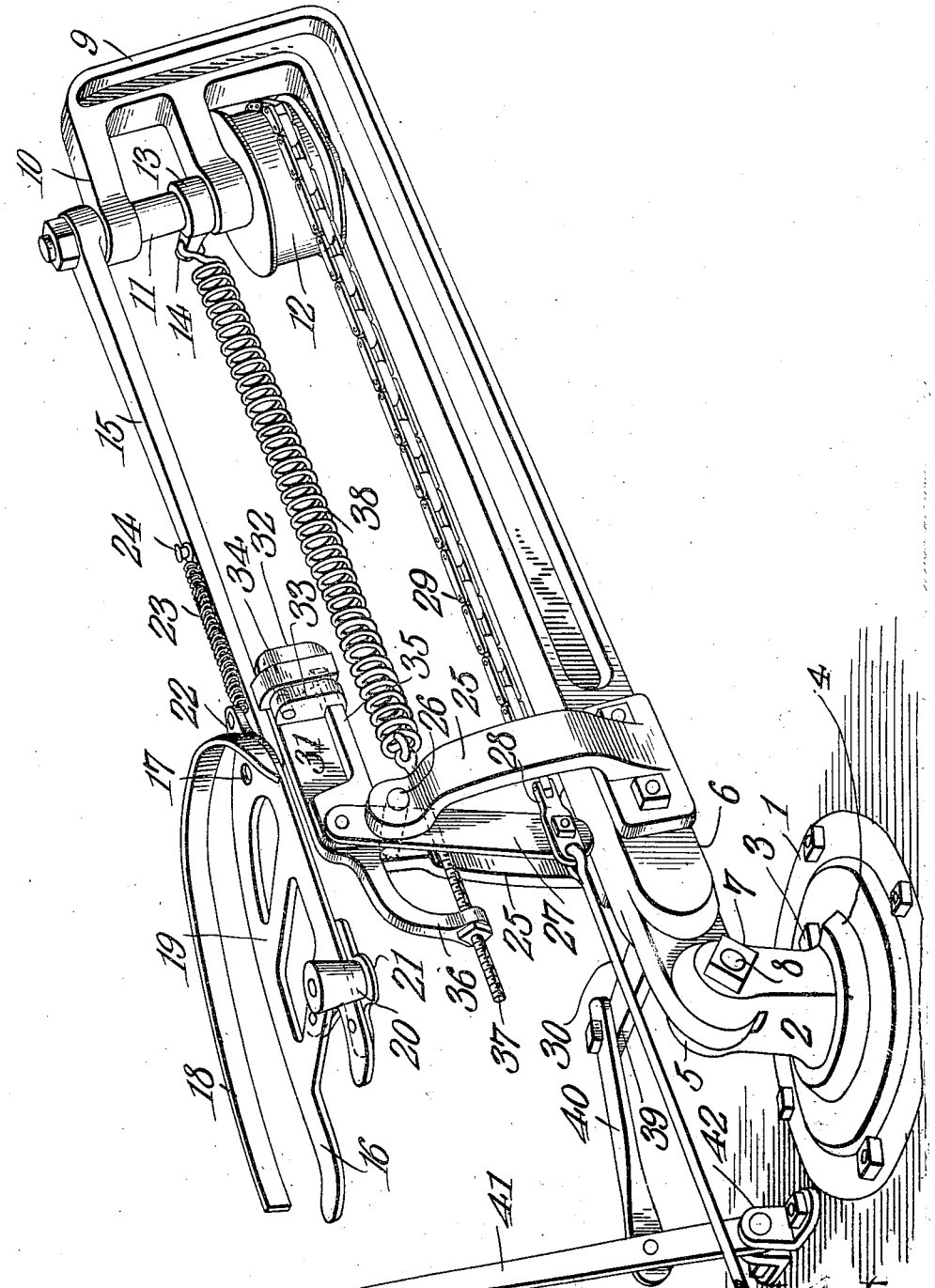

ARTHUR M. McCREA, OF LAMAR, MISSOURI.

TARGET-TRAP.

No. 841,423.   Specification of Letters Patent.   Patented Jan. 15, 1907.

Application filed August 16, 1906. Serial No. 330,904.

*To all whom it may concern:*

Be it known that I, ARTHUR M. MCCREA, a citizen of the United States, residing at Lamar, in the county of Barton and State of Missouri, have invented a new and useful Target-Trap, of which the following is a specification.

This invention relates to target-traps of that general class employed for throwing frangible targets; and it is more particularly an improvement upon the trap covered by Letters Patent No. 824,806, granted to me on July 3, 1906.

The object of the invention is to simplify the construction of the trap by reducing the number of parts necessary to produce an efficient device.

A still further object is to provide novel means for setting and resetting the throwing-arm of the trap.

A still further object is to provide simple means for adjusting the trap to desired angles vertically and horizontally.

With the above and other objects in view the invention consists of a base on which is supported a horizontally and vertically adjustable arm, which constitutes the main body of the trap. A shaft is rotatably mounted within the arm and has a throwing-arm movable with it. Flexible means are employed for partly rotating the shaft so as to tension a spring suitably connected to the shaft, and novel trigger mechanism is employed for automatically locking the throwing-arm when it has been set and for quickly releasing it whenever desired.

The invention also consists of certain other novel features of construction and combinations of parts, which will be hereinafter more fully described, and pointed out in the claims.

In the accompanying drawing, which is a perspective view of the target-trap, I have shown the preferred form of the invention.

Referring to said drawing by characters of reference, 1 is a base in which is swiveled a standard 2, adapted to be limited in its movement by a lug 3, which works between the ends of a curved flange 4, formed upon the base. Standard 2 is forked at its upper end, as shown at 5, and pivoted within this fork is one end of an arm 6, which constitutes the body of the trap. This arm is adapted to be locked at any desired angle to the vertical by means of a nut 7, arranged upon the pivot-bolt 8, and which when tightened clamps the fork upon the end of the arm. An upright 9 is arranged at the free end of arm 6 and has inwardly-extending brackets 10, in which is journaled a shaft 11, arranged at right angles to and journaled at one end within the arm 6. Said shaft has a drum or pulley 12 secured to it close to arm 6, and a collar 13 is also secured to the shaft and has an arm 14 radiating therefrom. Secured to the upper end of shaft 11, so as to move therewith, is a throwing-arm 15, having a target-clamping jaw 16, pivotally connected to one end thereof, as shown at 17, and having a curved leaf-spring 18, which is secured to the base 19 of the jaw and is adapted to coöperate with a substantially cylindrical block 20 for the purpose of holding a target in position. This block is connected to a pivoted arm 21, which is of the usual construction, such as illustrated in my patent aforesaid. An arm 22 extends from the base 19 and is connected by a tension-spring 23 with a lug 24 on the throwing-arm.

Curved supporting-arms 25 are secured to the arm 6, near the pivoted end thereof, and are connected at their upper ends by a pivot 26, on which is fulcrumed a lever 27. A plate 28 is secured to the lower end of this lever and from this plate extends a chain 29, which is secured to and adapted to be wound upon the drum or pulley 12. A rod 30 is also connected to the plate 28, so that the same can be swung backward or forward by the operator. A head 31 extends from one of the arms 25 and has parallel ears 32 and 33 thereon, between which is pivoted a keeper 34, the upper end of which is beveled and projects into the path of the throwing-arm 15. The lower end of the keeper is adapted to be normally overlapped by a locking-arm 35, which is pivoted to the upper end of lever 27 and is movably mounted within the lower portion of the ear 33. An arm 36 extends downward from the head 31, and a screw 37 is adjustably mounted therein. An operating-spring 38 is connected at its ends to this screw and to the arm 14.

In order that the trap may be adjusted horizontally, an arm 39 extends laterally from arm 6 at a point adjacent the standard 2, and this arm is connected by a link 40 with a lever 41, fulcrumed between ears 42.

In using the trap herein described the target is placed within the clamping-jaw in the usual manner and by pulling backward on the rod 30 chain 29 is unwound from the pulley or drum 12, while the throwing-arm 15 is swung over the keeper 34 and into position in rear thereof, said keeper serving to automatically lock it. This movement of the shaft 11 and arm 15 of course causes the arm 14 to swing toward the upright 9, and thereby tension the spring 38. By manipulating the lever 41 the trap can be swung to a desired angle to the horizontal. When the parts have been properly set, the operator pushes forward on the rod 30, a very slight movement being sufficient to pull the arm 35 out of position in rear of keeper 34. Said keeper will therefore be relieved of its holding means and will offer no obstruction to the movement of the arm 15. Said arm can therefore be swung around by the tensioned spring 38 with sufficient velocity to discharge the target from between the block 20 and the spring 18. Spring 23 holds the target-clamping jaw normally in direct alinement with the throwing-arm, but of course yields under the influence of centrifugal force during the movement of the throwing-arm. Spring 38 is utilized to impart sufficient velocity to the throwing-arm to cause the target to discharge from the jaws, and said spring also constitutes a cushion to limit or cushion the swinging movement of the arm during this throwing operation. It will be seen that the target is very small and compact in structure, is formed of few parts, and can be quickly set and released.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the claims.

What is claimed is—

1. In a target-trap the combination with a body; of a shaft supported thereby, a throwing-arm movable with the shaft, a spring adapted to be tensioned by the movement of the arm in one direction, a keeper for holding the arm against movement in one direction, an actuating-rod, means operated by the movement of the rod in one direction for swinging the arm into engagement with the keeper and tensioning the spring, and means operated by the movement of the rod in the opposite direction for releasing the keeper and freeing the arm.

2. In a target-trap the combination with a body; of a keeper pivotally supported thereabove, a locking-arm for holding the keeper against movement in one direction, a lever for actuating said arm, a throwing-arm, a combined actuating and cushioning spring for said arm, means connected to the lever for tensioning the spring, and means for actuating said lever to alternately tension the spring and to release the keeper.

3. In a target-trap the combination with a body, and means for adjusting the same; of a shaft supported by the body, a throwing-arm secured to and movable with the shaft, a pulley secured to said shaft, an arm radiating from the shaft, a combined actuating and cushioning spring connected to said arm, a keeper in the path of the throwing-arm, a locking-bar for said keeper, a lever for withdrawing the locking-bar from engagement with the keeper, a flexible connection between said lever and the pulley, and means for actuating the lever.

4. In a target-trap the combination with a body, and means for adjusting the same; of a throwing-arm mounted to swing upon the body, a keeper pivotally supported above the body and in the path of the throwing-arm, a latch for holding the keeper against movement in one direction, a combined actuating and cushioning spring for the throwing-arm, and means movable in one direction for tensioning the spring and swinging the arm in engagement with the keeper and movable in an opposite direction for releasing the keeper.

5. In a target-trap the combination with a body; of a throwing-arm pivotally mounted to swing upon the body, a combined actuating and cushioning spring for said arm, a head supported above the body, a keeper pivotally connected thereto and normally extending into the path of the arm, a latch for normally holding the keeper against movement in one direction, and means movable in one direction for swinging the arm into engagement with the keeper and placing the spring under tension and movable in an opposite direction for withdrawing the latch from the keeper.

6. In a target-trap the combination with a body; of a throwing-arm mounted to swing thereon, a head rigidly supported above the body, a keeper pivotally mounted upon the head and normally projecting into the path of the throwing-arm, a combined actuating and cushioning spring for the arm; a latch normally holding the keeper in position to lock the arm against the tension of the spring, and means movable in one direction for swinging the arm into engagement with the keeper and tensioning the spring and movable in an opposite direction for withdrawing the latch from the keeper.

In testimony that I claim the foregoing as my own I have hereto affixed my signature in the presence of two witnesses.

ARTHUR M. McCREA.

Witnesses:
CHAS. B. EDWARDS,
F. M. CONRAD.